United States Patent [19]

Pippert et al.

[11] 4,428,590
[45] Jan. 31, 1984

[54] ANTI-EXTRUSION SEALING DEVICE WITH HINGE-LIKE BRIDGE SECTION

[75] Inventors: Aaron J. Pippert, Houston; H. T. Miser, Missouri City, both of Tex.

[73] Assignee: Utex Industries, Inc., Houston, Tex.

[21] Appl. No.: 322,727

[22] Filed: Nov. 19, 1981

[51] Int. Cl.³ .............................................. F16J 15/18
[52] U.S. Cl. ................................ 277/188 A; 277/166; 277/184; 277/185
[58] Field of Search ............... 277/136, 137, 166, 184, 277/185, 188 R, 188 A

[56] References Cited

U.S. PATENT DOCUMENTS

| | | | |
|---|---|---|---|
| 2,063,724 | 12/1936 | Cater | 277/188 R X |
| 2,183,004 | 12/1939 | Boyd | 277/184 |
| 2,512,098 | 6/1950 | Gratzmuller | 277/166 X |
| 2,679,441 | 5/1954 | Stillwagon | 277/188 R X |
| 2,815,973 | 12/1957 | Jackson | 277/188 A |
| 2,934,363 | 4/1960 | Knox | 277/188 A X |
| 3,009,721 | 11/1961 | Newton | 277/188 A |
| 3,106,407 | 10/1963 | Mattingly | 277/188 A |
| 3,188,099 | 6/1965 | Johnson et al. | 277/188 A |
| 3,195,906 | 7/1965 | Moyers | 277/166 X |
| 3,271,038 | 9/1966 | Bastow | 277/188 R X |
| 3,279,805 | 10/1966 | Quinson | 277/188 R X |
| 3,521,893 | 7/1970 | Josephson | 277/188 A |
| 4,040,636 | 8/1977 | Albertson et al. | 277/188 A |
| 4,219,204 | 8/1980 | Pippert | 277/152 X |

FOREIGN PATENT DOCUMENTS

| | | | |
|---|---|---|---|
| 779763 | 7/1957 | United Kingdom | 277/188 A |
| 984740 | 3/1965 | United Kingdom | 277/188 A |
| 1056960 | 2/1967 | United Kingdom | 277/188 A |

Primary Examiner—Robert S. Ward
Attorney, Agent, or Firm—Browning, Bushman, Zamecki & Anderson

[57] ABSTRACT

A seal and method of making same wherein a first body is formed with a plurality of parallel, spaced part bores therethrough. A second body is molded onto the first body so that it fills the bores and forms enlarged portions adjacent the ends of the bores, whereby the two bodies are permanently mechanically interlocked.

15 Claims, 13 Drawing Figures

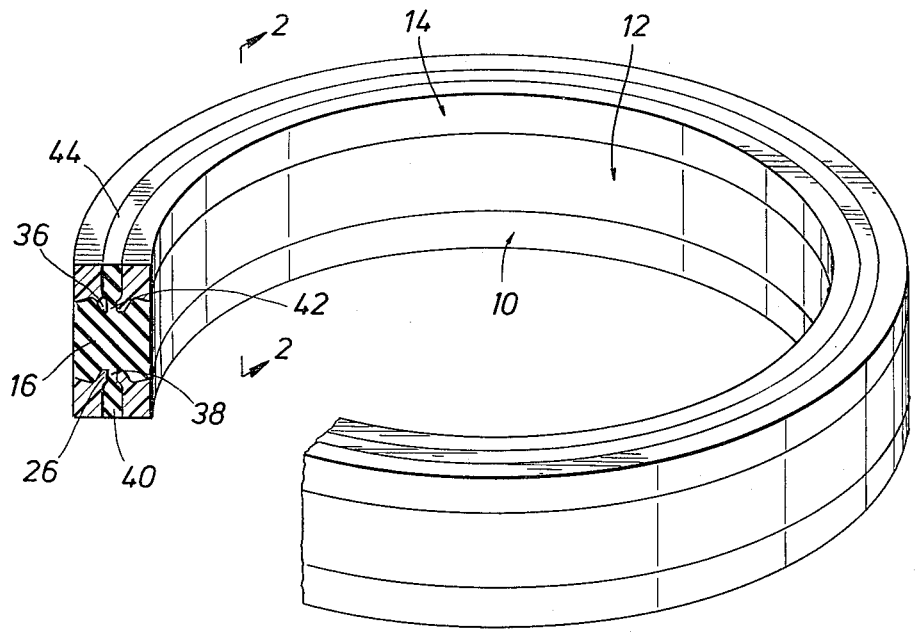
FIG. 1
FIG. 2
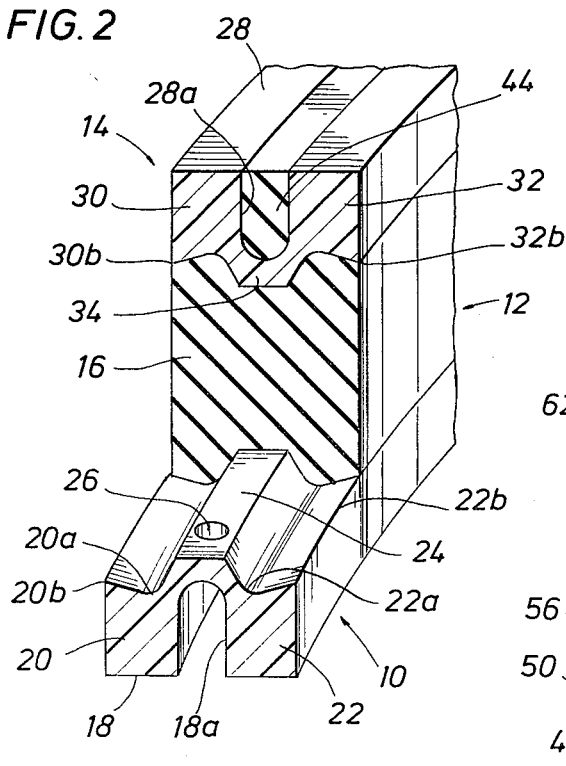
FIG. 3
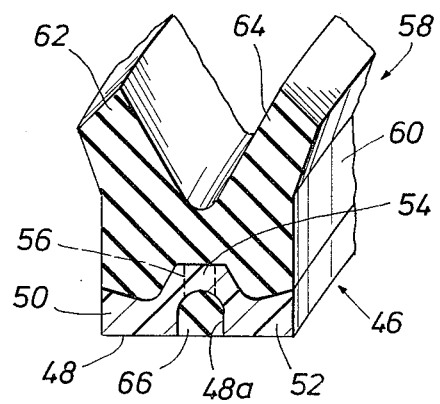

ANTI-EXTRUSION SEALING DEVICE WITH HINGE-LIKE BRIDGE SECTION

BACKGROUND OF THE INVENTION

The present invention pertains to sealing devices or systems wherein the seal per se is relatively soft, flexible or deformable. In particular, the invention deals with an improved means for presenting undesired extrusion of such seals. When such a sealing device is in place between the two rigid surfaces against which it is intended to seal, the pressure being sealed against may tend to extrude the seal material out of its intended position, e.g. in a groove or the like in one of the two surfaces, and into a smaller adjacent clearance between the two surfaces. This can lead to deformation of the seal, damage to the seal, and/or loss of sealing effectiveness.

In the past, one technique for dealing with such undesirable extrusion has been to place a rigid retainer member adjacent the relatively soft seal device. For example, if the seal device is an annular member, the retainer might be a rigid washer or the like. However, it is generally preferable to utilize a one-piece seal, e.g. for ease in handling, installation, and servicing. Accordingly, there have been various prior attempts to devise one-piece seals including relatively soft sealing sections and harder anti-extrusion sections. In some cases, the two sections have been bonded together, while in others, they have been separately formed so that they can be snapped together by means of undercut grooves or the like. However, these designs can present additional problems, particularly as the two sections can fairly easily become separated and/or misaligned in use. Additionally, these prior art seals are expensive inasmuch as the adhesives used for bonding are costly and tooling to make the seals employing undercut grooves can present design problems.

SUMMARY OF THE INVENTION

The present invention provides a manufacturing method and resulting sealing device in which a relatively soft body, including a sealing portion, and a harder body, which serves as an anti-extrusion device for the soft body, are permanently joined together by mating mechanical interlock formations. Nevertheless, each of the two bodies is itself integral. More specifically, in the present invention, the first body, usually the harder anti-extrusion body, is formed with a plurality of generally parallel, spaced apart bores therethrough. The second body is then molded onto the first body so that it extends through and substantially fills the bores, and also forms enlarged portions adjacent the opposite ends of the bores. The portions of the second body which extend through the bores of the first body prevent relative displacement of the bodies in directions transverse to the bores, while the enlarged portions of the second body adjacent the ends of the bores prevent relative displacement parallel to the bores. Thus, the sealing device formed in accord with the present method includes two integral bodies which are permanently mechanically interlocked in the sense that they cannot be separated without destruction of one or the other of the bodies.

The sealing device of the invention may be embodied in numerous different forms. In some embodiments, there is a third anti-extrusion body, formed as a mirror image of the first body, and interlocked with the second body in the same manner. The first and/or third bodies may be configured so as to permit a hinging type action in use, even though the first and third bodies may be formed of relatively hard materials.

Accordingly, it is a principal object of the present invention to provide an improved sealing device having integral bodies of different physical properties, permanently mechanically interlocked.

Another object of the present invention is to provide a method for making such an improved sealing device.

Still another object of the present invention is to provide such a method and sealing device in which one body is molded onto and through the other body.

Yet another object of the present invention is to provide a sealing device having an anti-extrusion body capable of hinging-type action in use.

Still other objects, features, and advantages of the present invention will be made apparent by the following detailed description, the drawings, and the claims.

BRIEF DESCRIPTION OF THE DRAWING

FIG. 1 is a perspective view, partially broken away, of a first embodiment of sealing device according to the present invention.

FIG. 2 is a detailed sectional perspective view taken along the line 2—2 of FIG. 1, and with parts broken away.

FIG. 3 is a perspective view, showing a transverse cross section, of a second embodiment of sealing device according to the present invention.

DETAILED DESCRIPTION OF PREFERRED EMBODIMENT

Figure 4:
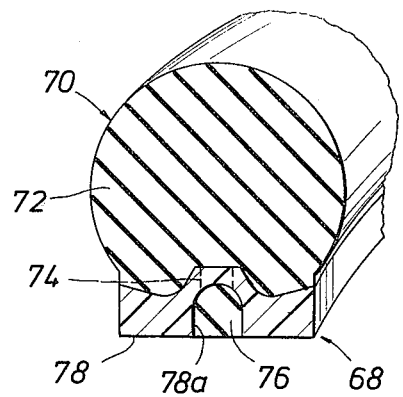
FIG. 4 is a view similar to that of FIG. 3 showing a third embodiment of the present invention.

Referring back to the drawings, FIGS. 1 and 2 illustrate a first embodiment of the invention. More specifically, FIGS. 1 and 2 illustrate a sealing device in the form of a seal ring. However, it should be understood that the various crosssectional configurations disclosed herein could all be incorporated alternatively in seal rings, either split or continuous, as well as in strip packings. For purposes of the present discussion, the "length" of an annular sealing device will refer to its circumferential dimension. The axially facing surfaces of such an annular device, i.e. the upper and lower surfaces as viewed in the drawings, will be referred to as the "end surfaces," while the radially inwardly and outwardly directed surfaces will be considered the "side surfaces." Analogous parts of a strip packing will, for convenience, be referred to by analogous terms. Also, terms such as "upper" and "lower" will, for convenience, be used herein with reference to the drawings but not in a limiting sense.

Referring again to FIGS. 1 and 2, the seal ring is a compression type seal comprised of first, second, and third annular bodies 10, 12, and 14 respectively.

Bodies 10 and 14, which are located at opposite ends of the device, are relatively hard and serve as the anti-extrusion bodies. Body 12 is the sealing body and is relatively soft. Body 12 has a large central annular portion 16 located between bodies 10 and 14, which serves as the sealing portion of the device, as well as additional portions which extend into bodies 10 and 14 to form therewith permanent mechanical interlocking formations, to be described more fully below.

Body 10 defines a base surface 18 facing outwardly at one end of the device as a whole. Base surface 18 has a central groove 18a therein extending around the entire circumference of the device. Body 10 further comprises a pair of side sections 20 and 22 located on opposite sides of groove 18a, and a bridge section 24 connecting the side sections 20 and 22 across the bottom of groove 18a. A plurality of bores 26 extend through bridge section 24, generally perpendicular to base surface 18, and communicate with groove 18a. Side sections 20 and 22 have their minimum thickness adjacent bridge section 24 where their upper surfaces have low points 20a and 22a. From low points 20a and 22a, the upper surfaces of side sections 20 and 22 are tapered upwardly (i.e. inwardly away from base surface 18 and toward sealing portion 16) and laterally outwardly terminating at points 20b and 22b respectively. It should be noted that bridge section 24 is offset from side sections 20 and 22 in the direction away from base surface 18 (i.e. upwardly as viewed in the drawing) whereby the depth of groove 18a may be made at least as great as the minimum thicknesses of the side sections 20 and 22 closely adjacent groove 18a (i.e. at 20a and 22a). Thus, groove 18a effectively forms a complete lateral separation between side sections 20 and 22.

Body 14 is formed as a mirror image of body 10. Briefly, body 14 includes an upwardly facing base surface 28 having a groove 28a therein. Body 14 further comprises a pair of side sections 30 and 32 effectively completely separated by groove 28a, but connected across the bottom of groove 28a by a bridge section 34. Spaced apart bores 36 extend through bridge section 34 in communication with groove 28a. The configuration of the lower surface of body 14 is a mirror image of that of the opposed upper surface of body 10, including offsetting of bridge section 34 away from base surface 28, and graduation of the thicknesses of side sections 30 and 32 from minima adjacent bridge section 34 to maxima at the laterally outer extremities of the device.

To make a device as shown in FIGS. 1 and 2, bodies 10 and 14 are emplaced in a mold in opposed, spaced apart relation. together with material of the type of which body 12 is to be formed. Under suitable temperature and pressure conditions, the material of body 12 mold fills the space between bodies 10 and 14, and further, flows into and fills bores 26 and 36 and grooves 18a and 28a. Body 12 is then cured or otherwise treated in the appropriate manner. In the finished product, body 12 includes not only sealing portion 16, but also projections, one of which is shown at 38, extending through bores 26, retainer portion 40 filling groove 18a, projections 42 extending through bores 36, and retainer portion 44 filling groove 28a. Portions 16, 38, 40, 42, and 44 of body 12 form a single, continuous, integral body which is mechanically interlocked with bodies 10 and 14.

It can be seen that the projections 38 which extend into and fill bores 26 prevent relative displacement of bodies 10 and 12 in all directions transverse to bores 26. Meanwhile, sealing portion 16 and retainer portion 40 integrally connect projections 38 at respective opposite ends of the bores 26. Portions 16 and 40 are of greater dimensions transverse to bores 26, than the diameters of the bores themselves, and abut body 10 so that they prevent relative displacement of bodies 10 and 12 in the direction parallel to bores 26. The somewhat torturous configuration of the upper surface of body 10, and the mating configuration of the lower surface of sealing portion 16 of body 12 further resist relative displacement of the bodies from side to side. Body 14 is similarly interlocked with body 12, and the interlocking of all three bodies is permanent in the sense that the bodies cannot be separated without cutting, tearing, or otherwise destroying one or more of them.

In use, the device of FIGS. 1 and 2 is emplaced between two rigid structures or surfaces to be sealed against. These might be, for example, relatively reciprocating structures such as a piston and cylinder, relatively rotating structures such as a shaft and stuffing box, or relatively stationary structures such as a housing and cover. Sealing portion 16 would form a compression type seal against said two structures or surfaces, while bodies 10 and 14 would prevent undesired extrusion of the material of sealing portion 16 in respective endwise directions. The tapering of the upper surface of body 10 and the lower surface of body 14 inwardly toward each other at their lateral extremity to form rim like edges 20b, 22b, 30b, and 32b helps to contain the material of sealing portion 16 at the lateral extremities of the device where extrusion is most likely to occur.

As mentioned, the depths of the grooves 18a and 28a are at least as great as, and preferably slightly greater than, the thicknesses of the immediately adjacent portions of the side sections of the anti-extrusion bodies 10 and 14. This permits the use of a relatively hard or rigid material or combination of materials in the anti-extrusion bodies 10 and 14, while still allowing said bodies to move with a hinge-like action about their respective bridge sections 24 and 34. This hinge-like action effectively permits the anti-extrusion body to expand laterally to bridge a gap between the surfaces being sealed against, and thereby prevent extrusion. For example, because the areas above and below body 10 are interconnected by portions 40, 38 and 16 of elastomeric body 12, pressure exerting a force in the upper direction, as viewed in the drawing, can exert an hydraulic-like force through portions 40 and 38 and into sealing portion 16, tending to extrude the material of portion 16 past upper anti-extrusion body 14. However, the same hydraulic-like force will tend to cause the material of sealing portion 16 to flow through bores 34 in upper body 14 and into groove 28a. This in turn will cause side sections 30 and 32 of body 14 to expand laterally away from each other, such expansion being permitted by the aforementioned hinge-like effect, so that side sections 30 and 32 will block the attempted extrusion of sealing portion 16. Accordingly, anti-extrusion bodies of the type shown at 10 and 14 are particularly useful in applications where there may be relatively large tolerances to the spacing between the surfaces being sealed against and/or in applications in which it is desired to use a very hard material, such as a rigid thermosetting material or a metal, which would otherwise be incapable of flexing, in the anti-extrusion bodies.

FIG. 3 shows a second embodiment of sealing device, having only a single anti-extrusion body 46. Body 46 is substantially indentical to body 10 of FIGS. 1 and 2, except that its side sections are somewhat thinner. Thus, body 46 will not be described in great detail. Briefly, it includes a lower base surface 48 having an elongate groove 48a therein. Side sections 50 and 52 are disposed on opposite sides of groove 48a and connected across the bottom of groove 48a by a bridge section 54 offset from side sections 50 and 52 in the direction away from base surface 48. Bridge section 54 has a plurality of parallel, circumferentially spaced apart bores, one of which is indicated at 56, extending therethrough and communicating with groove 48a.

The sealing device of FIG. 3 also differs from that of FIGS. 1 and 2 in the nature of the sealing portion 60 of its second body 58. Rather than the generally rectangular compression type seal shown in FIGS. 1 and 2, sealing portion 60 in FIG. 3 is a lip type seal having a pair of lips 62 and 64 extending generally endwise away from anti-extrusion body 46 and also diverging laterally away from each other as shown. Such seals can also be formed with a single lip, depending on their intended use. Body 58 is mechanically interlocked with body 46 in the same manner as in the embodiment of FIGS. 1 and 2. More specifically, body 58 is molded onto and into body 46 so that it forms, integrally with its sealing portion 60, projections extending through and filling bores 56, as well as a retainer portion 66 filling groove 48a. Sealing portion 60 and retainer portion 66 form enlarged portions of body 58 linking the projections extending through bores 56 at respective opposite ends of the bores to form a permanent mechanical interlock.

FIG. 4 shows a third embodiment of sealing device likewise having a single anti-extrusion body 68 substantially identical to body 46 of FIG. 3. Body 68 is mechanically interlocked, by molding as described above, with a second body 70, the latter including a sealing portion 72, integral projections extending from portion 72 through bores 74 in body 68, and a retainer portion 76 adjoining the opposite ends of said projections and filling groove 78a in base surface 78 of anti-extrusion body 68. The device of FIG. 4 differs from that of FIG. 3 in that its sealing portion 72, rather than a lip type seal, is a solid curved seal similar to an O-ring.

Figure 5:
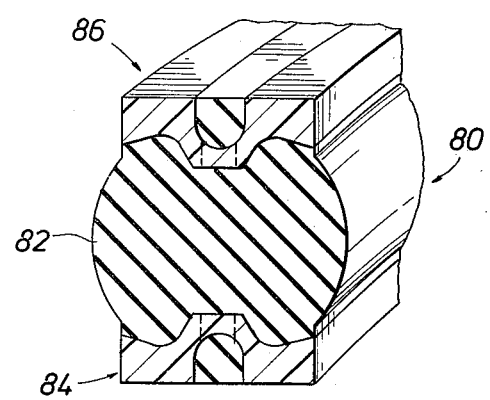
FIG. 5 is a view similar to that of FIG. 3 showing a fourth embodiment of the present invention.

FIG. 5 discloses still another embodiment, in which the sealing portion 82 of the relatively soft sealing body 80 is likewise a rounded O-ring-like seal, but in which two anti-extrusion bodies 84 and 86 are provided. Bodies 84 and 86 are virtually identical to bodies 46 and 68 described above, and are arranged to form mirror images of each other on opposite ends of sealing portion 82. Bodies 84 and 86 are mechanically interlocked with body 80 as in the other embodiments described hereinabove.

Figure 6:
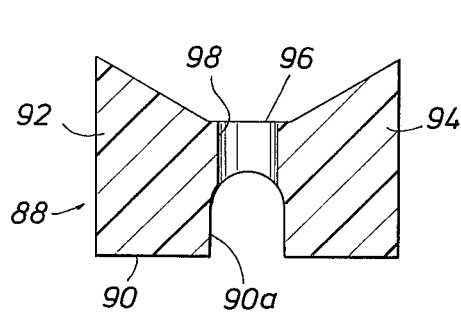
FIG. 6 is a transverse cross-sectional view of an alternative form of anti-extrusion body.

In all the embodiments thus far described, the anti-extrusion bodies are designed to be capable of a hinge-like action, as described above, even if the materials of which they are formed are quite hard. FIG. 6 shows a simplified form of anti-extrusion body 88 which may be used either in instances in which maximum hinging action is not needed, e.g. close tolerance, or in instances in which it is possible to form the anti-extrusion body of materials which, while harder than the sealing body, are more flexible than the types of materials contemplated for the embodiments of FIGS. 1 through 5. Like the preceeding embodiments, body 88 includes a base surface 90 having a central longitudinal groove 90a. Side sections 92 and 94 are located on opposite sides of groove 90a and connected across the bottom of 90a by a bridge section 96. However, bridge section 96 is not offset from the side sections 92 and 94, so that groove 90a does not effectively completely laterally separate the side sections. Thus, bridge section 96 may or may not act somewhat like a hinge, depending upon the materials employed. In any event, bridge section 96 does include a plurality of spaced apart bores 98 communicating with groove 90a for receipt of projections of a softer sealing material to interconnect the sealing portion to be disposed above body 88 and the retainer portion to be disposed in groove 90a.

Figure 7:
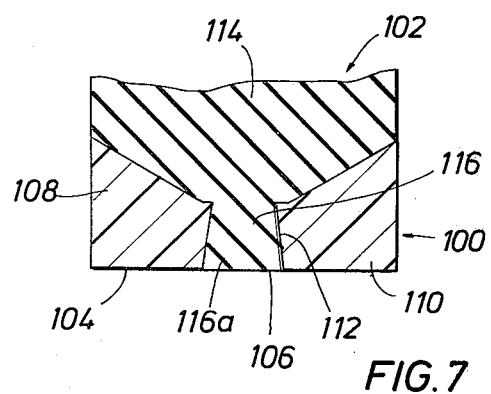
FIG. 7 is a partial transverse cross-sectional view of a fifth embodiment of sealing device according to the present invention.
Figure 8:
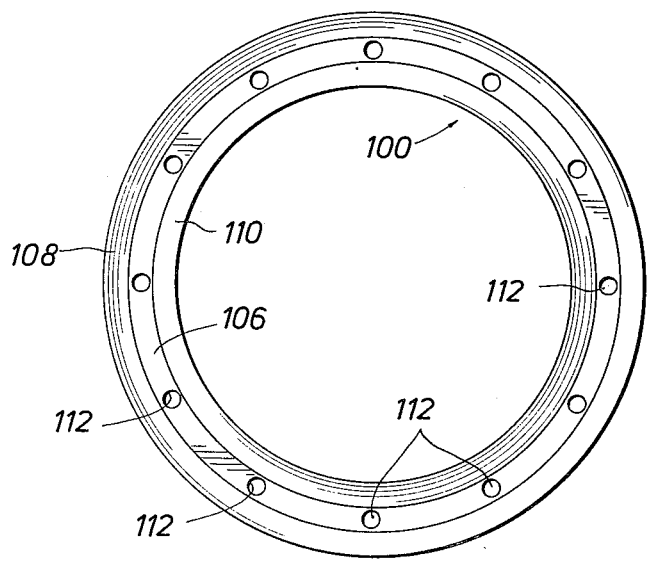
FIG. 8 is a top elevational view of the anti-extrusion body of the sealing device of FIG. 7.

FIGS. 7 and 8 show a further modified form of anti-extrusion body 100. In FIG. 7 body 100 is shown interconnected with a sealing body partially illustrated at 102. The base surface 104 of body 100 does not include a groove, but rather, is continuous with bridge section 106 which connects the side sections 108 and 110. Due to the absence of such a groove, the body 100 will have virtually no hinging action, and thus is designed for installations in which such action is not needed. Also, because of the absence of the groove, sealing body 102 does not include a retainer formation such as 76 of the embodiment of FIG. 4. Rather, the bores 112 through bridge section 106 have diameters which are graduated from a minimum immediately adjacent sealing portion 114 of body 102 to a maximum adjacent base surface 104. Accordingly, since the elastomeric material of body 102, when molded onto and into body 100, will form a projection 116 filling bore 112, said projection will have an enlarged portion 116a located adjacent the lower end of bore 112. Portion 116a is larger in diameter than the minimum diameter of bore 112, i.e. at its upper end. Thus, portion 116a will prevent upward displacement of body 102 with respect to body 100, while sealing portion 114, which can be of any desired form, will prevent downward displacement.

Figure 9:
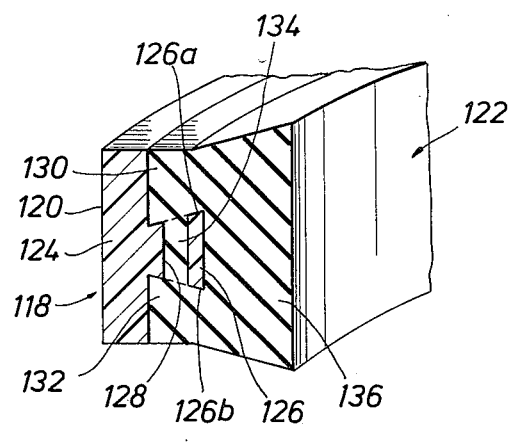
FIG. 9 is a view similar to that of FIG. 3 showing a sixth embodiment of sealing device according to the present invention.
Figure 11:
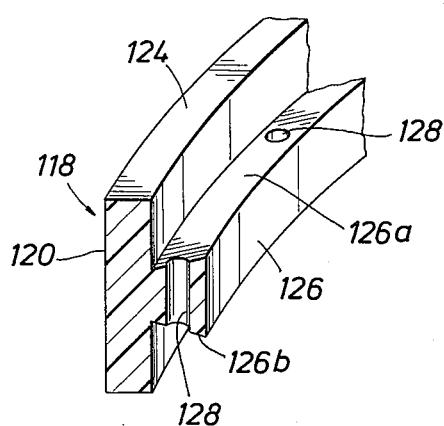
FIG. 11 is a detailed perspective view, showing a transverse cross section, of an alternative form of anti-extrusion body for the types of seals shown in FIGS. 9 and 10.

In all the embodiments described above, the base surfaces of the anti-extrusion bodies extended along one or both ends of the sealing device as a whole. In FIGS. 9 and 11 there is shown an embodiment in which the anti-extrusion body 118 has a base surface 120 extending along one side of the device. The sealing body 122 is disposed generally on the other side of the device. In general, the type of seal shown in FIG. 9 seals both above and below itself, as seen in the drawings, but only at the inner diameter of the structure on which it is carried. It will be understood that similar seals could be formed with the positions of bodies 118 and 122 reversed, so as to seal at the outer diameter. In the device of FIG. 9, the anti-extrusion body 118 includes a thickened base section 124 extending along the base surface 120. Body 118 also includes an annular locator section 126 extending laterally from section 124, in the direction away from base surface 120, approximately midway between the upper and lower extremities of base section 124. Locator section 126 has a plurality of parallel, circumferentially spaced apart bores, one of which is shown at 128, extending therethrough parallel to base surface 120.

The sealing body 122 is molded onto and into the anti-extrusion body 118 in much the same manner as in the preceding embodiments. As thus formed, sealing body 122 includes two annular retainer portions 130 and 132 extending respectively along the upper and lower surfaces 126a and 126b locator section 126 of anti-extrusion body 118. Retainer portions 130 and 132 are integrally interconnected by projections 134 which extend through and fill bores 128. Retainer portions 130 and 132 are interconnected by an annular sealing portion 136 which extends across locator section 126 and radially inwardly therefrom. Sealing portion 136 has its upper and lower surfaces flared away from each other from their radially outer to their radially inner extremities as shown to enhance the ability of sealing portion 136 to form a compression type seal at the inner diameter of the device.

The mechanical interlocking of bodies 118 and 122 prevents relative displacement thereof. Retainer portions 130 and 132, abutting the upper and lower surfaces 126a and 126b of locator section 126, prevent displacement in a direction parallel to bores 128, while projections 134 extending through those bores prevent displacement transverse thereto. Radially inward displacement of body 122 with respect to body 118 is further resisted by the fact that surfaces 126a and 126b are flared away from each other from their radially inner to their radially outer extremities as shown.

Figure 10:
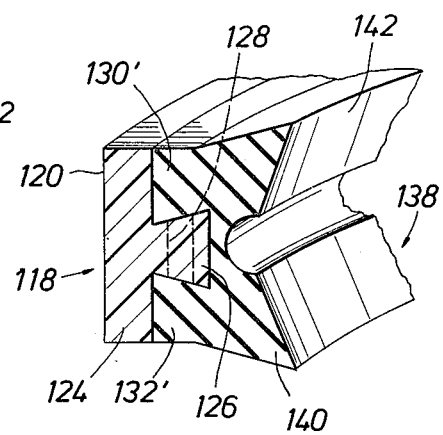
FIG. 10 is a view similar to that of FIG. 3 showing a seventh embodiment of sealing device according to the present invention.

FIG. 10 shows the same form of anti-extrusion body 118 as in FIGS. 9 and 11, but with a different type of sealing body 138. Like body 122 of FIG. 9, body 138 includes retainer portions 130' and 132' located respectively above and below locator section 126 of body 118. Body 138 also includes projections (not shown) which extend through bores 128 and integrally interconnect retainer portions 130' and 132'. Body 138 differs from body 122 in that its sealing portion, rather than being a solid compression type seal, comprises a pair of flared sealing lips 140 and 142 which can flex inwardly toward each other.

Figure 12:
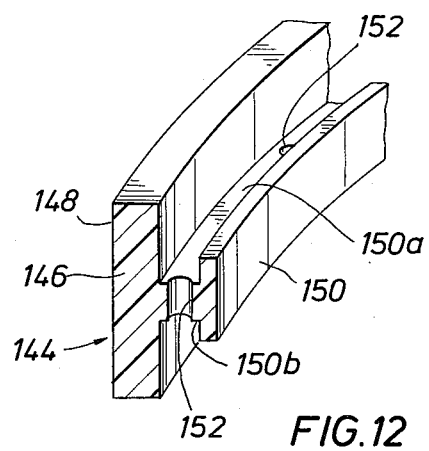
FIG. 12 is a view similar to that of FIG. 11 showing another alternative form of anti-extrusion body.

FIG. 12 shows a modification of the type of anti-extrusion body illustrated in FIG. 11. More specifically, the body 144 of FIG. 12 includes a base section 146 defining an outwardly facing base surface 148, both adapted to extend along the radially outer side of the sealing device. Also, body 144 includes a locator section 150 extending radially inwardly from the base section 146 approximately midway between its upper and lower extremities. Locator section 150 is annular and has a plurality of bores 152 extending therethrough generally parallel to base surface 148. Locator section 150 differs from the locator section 126 of the embodiment of FIG. 11 in that its upper and lower surfaces, rather than being smoothly tapered, are undercut as indicated at 150a and 150b.

Figure 13:
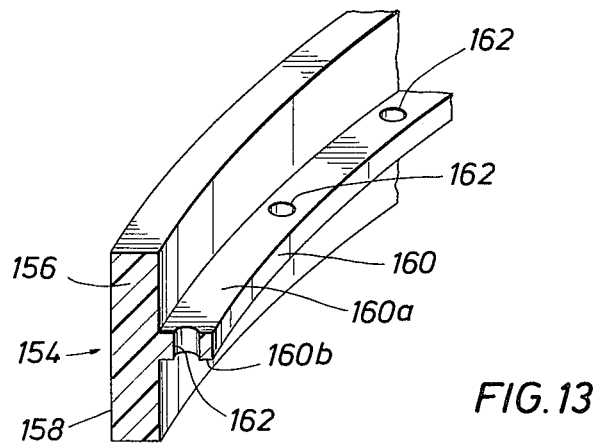
FIG. 13 is a view similar to that of FIG. 11 showing still another alternative form of anti-extrusion body.

FIG. 13 shows a still further modification of the type of anti-extrusion body illustrated in FIG. 11. Body 154 of FIG. 13 includes a base section 156 and base surface 158 substantially identical to members 146, 148 of FIG. 12 and members 124, 120 of FIG. 11. Likewise, body 154 includes an annular locator section 160 extending radially inwardly from base section 158 intermediate its upper and lower extremities. Locator section 160 has circumferentially spaced bores 162 therethrough. Unlike those of the preceding embodiments, locator section 160 does not have upper and lower surfaces which are designed to resist lateral movement of sealing body mounted thereon. Rather, the upper and lower surfaces 160a and 160b respectively extend generally perpendicular to base section 156, and sealing body material extending through bores 162 alone serves to resist the aforementioned lateral displacement.

In all of the preceding embodiments, the sealing bodies are preferably relatively soft and flexible. Examples of the materials of which the sealing bodies may be formed include nitriles, polyesters, fluorocarbons, silicones, and various natural and/or synthetic elastomers. These sealing bodies may be homogeneous or may be reinforced with fabrics, fibers, or filaments, e.g. of glass, cotton, asbestos, nylon, graphite, aramid, ceramic, and/or combinations of the above. The anti-extrusion bodies may be either thermoplastic or thermosetting in nature, but in any event, are preferably substantially harder or less flexible than the sealing bodies, whereby they perform their intended function of resisting extrusion of those sealing bodies. Examples of materials of which the anti-extrusion bodies may be formed are nylon, polyester, aramid, epoxy, phenol-formaldehyde, nitrile and silicone elastomers. Any of these materials may be reinforced with fabrics, fibers, of filaments, of the same types described above in connection with sealing bodies. The anti-extrusion bodies could also be made of metal or metal compositions, such as brass, copper, steel, or compressed metal fibers or filaments in various forms.

The above represent only examples of preferred embodiments of the invention, and various modifications will suggest themselves to those who skill in the art. By way of example only, the materials listed above are merely exemplary, and other materials and/or combinations of materials can be used. Likewise, numerous other configurations of the anti-extrusion bodies and/or the sealing bodies could be employed. Accordingly, it is intended that the scope of the present invention be limited only by the claims which follow.

We claim:

1. A sealing device comprising:
   a first relatively rigid, integral anti-extrusion body having female interlock formations thereon and a base surface, said base surface having a central groove therein, said first body further comprising a pair of side sections disposed on opposite sides of said groove and a bridge section connecting said side sections across the bottom of said groove, said bridge section being adapted to provide a hinge-like action permitting movement of said side sections toward and away from each other in the vicinity of said base surface;
   and a second relatively flexible, integral sealing body having interlock formations matingly engaging the interlock formations of said first body to permanently mechanically interlock said bodies and a sealing portion disposed on the opposite side of said first body from said base surface.

2. The device of claim 1 wherein said female interlock formations comprise
   at least one bore through said bridge section;
   said second body extending through said bore and having enlarged portions located generally adjacent the opposite ends of said bore, one of said enlarged portions comprising said sealing portion; and each of said enlarged portions having a dimension transverse to said bore greater than the minimum transverse dimension of said bore.

3. The device of claim 2 comprising a plurality of such bores disposed generally parallel to one another and spaced from one another along the length of said first body, said second body extending through and substantially filling each of said bores.

4. The device of claim 3 wherein the other of said enlarged portions of said second body is a retainer portion disposed in said groove and extending along the length of said first body and connecting the portions of said second body extending through said bores; and said sealing portion extends along the length of said first body and connects the portions of said second body extending through said bores.

5. The device of claim 4 wherein said bridge section is offset from said side sections in the direction away from said base surface.

6. The device of claim 5 further comprising a third body disposed across said sealing portion from said first body and forming a mirror image of said first body; said third body including a plurality of bores, and said second body including portions extending through said bores of said third body and another retainer portion disposed across said third body from said sealing portion in the groove of said third body and interconnecting the portions of said second body which extend through the bores of said third body.

7. A sealing device comprising:
an anti-extrusion body having a base surface, said base surface having a central groove therein, said anti-extrusion body further comprising a pair of side sections disposed on opposite sides of said groove and a bridge section connecting said side sections across the bottom of said groove, said bridge section being offset from said side sections in the direction away from said base surface such that the depth of said groove is at least as great as the thickness of said side sections adjacent said groove;
and a sealing body engaged with said anti-extrusion body and having a sealing portion disposed on the opposite side of said anti-extrusion body from said base surface.

8. The device of claim 7 wherein said bodies are secured together.

9. The device of claim 8 wherein said bodies are permanently secured together by mechanical interlock formations.

10. The device of claim 1 wherein the thickness of said bridge section, measured transverse to said base surface, is less than or equal to the width of said bridge section, measured parallel to said base surface.

11. The device of claim 10 wherein the depth of said groove is greater than or equal to its width.

12. The device of claim 1 wherein said first body comprises a polymeric material.

13. The device of claim 7 wherein the thickness of said bridge section, measured transverse to said base surface, is less than or equal to the width of said bridge section, measured parallel to said base surface.

14. The device of claim 2 wherein the depth of said groove is greater than or equal to its width.

15. The device of claim 2 wherein said anti-extrusion body comprises a polymeric material.

* * * * *

UNITED STATES PATENT AND TRADEMARK OFFICE
CERTIFICATE OF CORRECTION

PATENT NO. : 4,428,590
DATED : January 31, 1984
INVENTOR(S) : Aaron J. Pippert; H.T. Miser It is certified that error appears in the above—identified patent and that said Letters Patent is hereby corrected as shown below:

In Column 10, line 28, delete "2" and insert therefor --13--;

In Column 10, line 30, delete "2" and insert therefor --14--.

Signed and Sealed this

*Fourth* Day of *December 1984*

[SEAL]

*Attest:*

GERALD J. MOSSINGHOFF

*Attesting Officer*     *Commissioner of Patents and Trademarks*